United States Patent [19]

Kubota

[11] 3,746,779

[45] July 17, 1973

[54] TELEVISION CAMERA

[75] Inventor: Yasuharu Kubota, Kanagawa, Japan

[73] Assignee: Sony Corporation, Tokyo, Japan

[22] Filed: Oct. 5, 1971

[21] Appl. No.: 186,729

Related U.S. Application Data

[63] Continuation-in-part of Ser. No. 72,593, Sept. 16, 1970, Pat. No. 3,688,020.

[30] Foreign Application Priority Data

Oct. 6, 1970 Japan .............................. 45/87752

[52] U.S. Cl. .............................................. 178/5.4 ST

[51] Int. Cl. .............................................. H04n 9/06

[58] Field of Search .................... 178/5.4 ST, 5.4 H, 178/5.4 F

[56] References Cited

UNITED STATES PATENTS

| | | | |
|---|---|---|---|
| 2,789,157 | 4/1957 | Borkan et al. | 178/5.4 ST |
| 3,671,664 | 11/1968 | Tajiri et al. | 178/5.4 ST |
| 3,001,012 | 9/1961 | Braicks | 178/5.4 F |
| 2,689,271 | 9/1954 | Weimer | 178/5.4 ST |

*Primary Examiner*—Robert L. Griffin
*Assistant Examiner*—Joseph A. Orsino, Jr.
*Attorney*—Lewis H. Eslinger et al.

[57] ABSTRACT

A color television pickup system and device comprising three sets of strip electrodes capable of being energized to establish voltage patterns on the photoelectric surface of the device. When the surface is scanned by an electron beam, indexing signals are generated that depend on the voltage of the electrodes. This voltage is changed at the end of each scanning line interval. Optical strip filters aligned with the sets of electrodes in sets of fundamental color components color-separate light from the object being televised, and the signals generated by the photoelectric surface can be related to the light colors by the index signals. The output signals are selectively filtered, delayed, and combined to separate image signals from indexing signals, to produce luminance and chrominance signals, and to separate signals for each color.

12 Claims, 10 Drawing Figures

TELEVISION CAMERA

This application is a continuation-in-part of U.S. Patent Application Ser. No. 72,593, filed September 16, 1970, and which has issued as U.S. Pat. No. 3,688,020 on Aug. 29, 1972.

BACKGROUND OF THE INVENTION

1. Field of the Invention

The present invention relates to an image pickup device capable of producing separate color signals with only one image pickup tube. In particular, it relates to an image pickup device with which it is possible to produce balanced, separate color signals substantially free of crosstalk.

2. The Prior Art

A tri-color vidicon has been proposed heretofore as a color image pickup tube capable of producing individual color signals. In the vidicon, alternate red, green, and blue strip-like optical filters are located side by side and extend in the vertical direction between a glass support plate and a layer of photoconductive material. Semi-transparent signal electrodes in the form of conductive strips are superposed on the optical filters. These signal electrodes are divided into three groups which are interleaved with each other and each of which corresponds to one color. All of the electrodes within a group are connected together, but each group is insulated from the other two and the groups are connected to three signal output terminals. The electrodes are so arranged that rays of light from an object to be televised are focused on the photoconductive layer through the respective optical filters and the signal electrodes. The target is scanned with one electron beam to produce signals corresponding to red, green, and blue components of the incident light. These signals are available at the three output terminals, but such color image pickup devices have heretofore been subjected to an objectionable amount of crosstalk between the respective color signals due to the electrostatic capacitance between the signal electrodes.

It is one of the objects of the present invention to provide a color image pickup device capable of generating separate color signals without objectionable crosstalk.

BRIEF DESCRIPTION OF THE INVENTION

In the color image pickup device of the present invention, three sets of electrodes are interleaved on a photoelectric conversion layer in cyclic order and are supplied with alternating signals displaced in time from each other and synchronized with a scanning period to provide a potential distribution over the photoelectric conversion layer. A color-separated image of the object is projected on the photoelectric layer so that a composite color signal can be generated thereby. This signal includes the color signal and an index signal superimposed thereon.

DETAILED DESCRIPTION OF THE INVENTION

Figure 1:
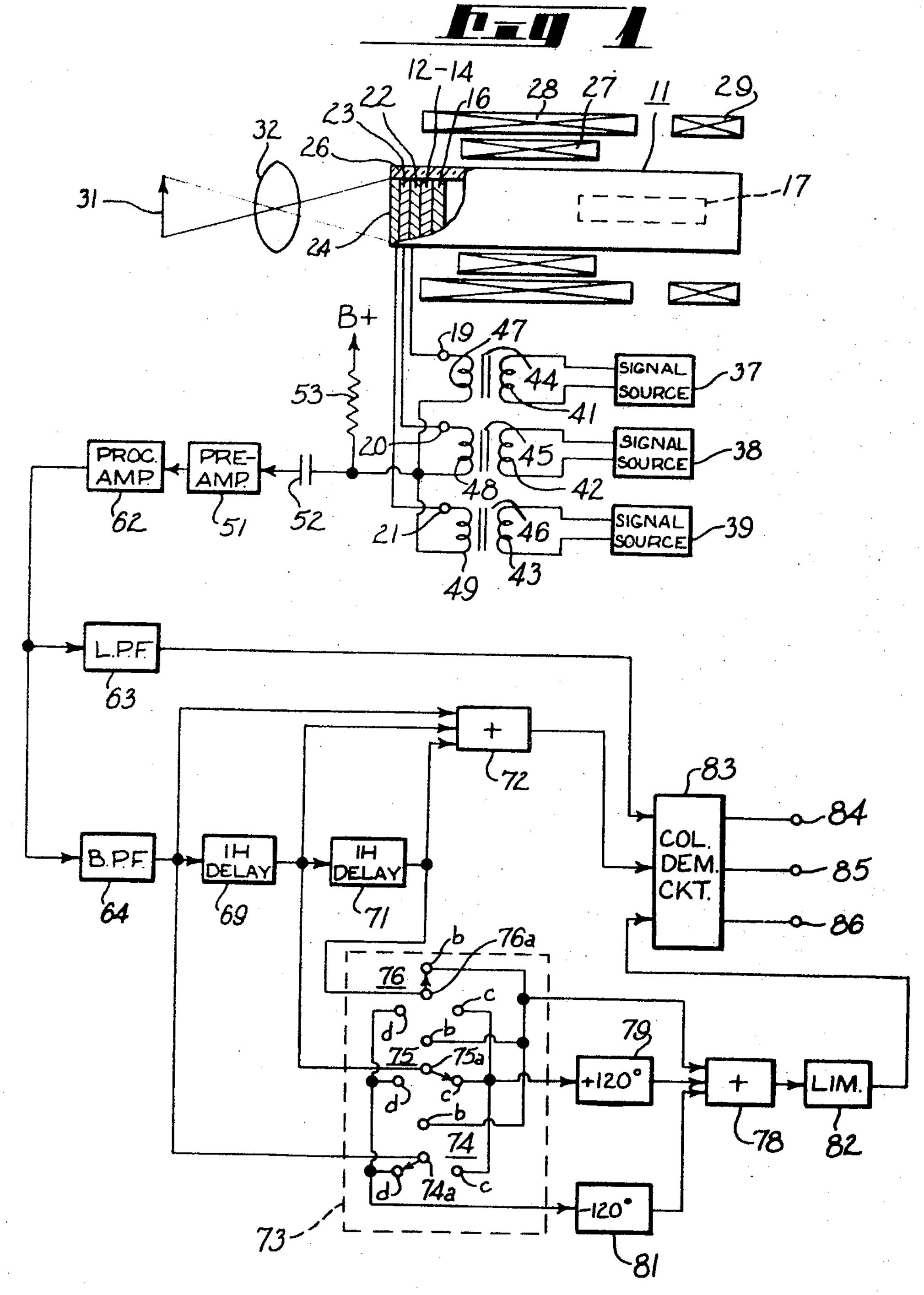
FIG. 1 is a block diagram of a system showing one example of a color pickup device according to the present invention.
Figure 2:
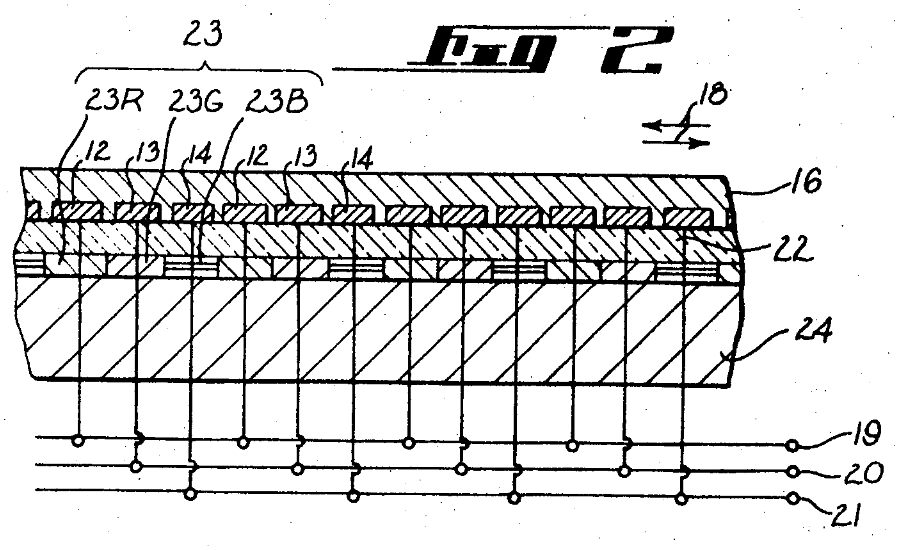
FIG. 2 is a cross-sectional view of a fragment of the pickup device shown in FIG. 1.

The pickup device shown in FIGS. 1 and 2 comprises an image pickup tube 11 that has three sets of strip-like transparent electrodes 12–14 arranged in a repetitive order: 12, 13, 14, 12, 13, 14,.... Each has a predetermined width of, for example, 20 microns and the electrodes are sequentially arranged at predetermined intervals of, for example, five microns on a photo-electric conversion layer 16, which is scanned by an electron beam from a gun 17. The layer 16 may be a photoconductive material such as antimony trisulfide. In this case, the electrodes 12–14 are arranged so that their longitudinal directions are different from the horizontal scanning direction of the electron beam. The latter direction is indicated by the arrows 18, and the longitudinal direction of the electrodes 12–14 is normally perpendicular to the scanning direction. All of the electrodes 12 are electrically connected together as are all of the electrodes 13 and 14 so that they form three sets of electrodes interleaved with each other. The sets of electrodes 12–14 are connected to three individual signal output terminals 19–21, respectively.

The electrodes 12–14 are formed on a transparent protective plate 22, for example a relatively thin glass plate, and the photoelectric conversion layer 16 is formed on the electrodes. On the other side of the glass plate 22 is an optical filter 23 that consists of red, green, and blue strip filter elements 23R, 23G, and 23B sequentially arranged in that order and located opposite the electrodes 12–14, respectively. A glass face-plate 24 is disposed on the optical filter 23. In this case, the electrodes 12–14 and the optical strip filter elements 23R, 23G, and 23B may be shifted in the direction of their array relative to each other.

The photoelectric conversion layer 16, the electrodes 12–14, the glass plate 22, the optical filter 23, and the glass face-plate 24 are formed as a unitary target structure with a disc-like configuration. This disc may have any convenient diameter, such as approximately 2.54cm., for example, and is attached to one end of a tube envelope 26. The tube envelope has a deflection coil 27, a focusing coil 28, and an alignment coil 29 mounted on it. Light rays from an object 31 to be televised are focused by a lens 32 on the photoelectric conversion layer 16.

The electrodes 12–14 are separately supplied with signals S33–S35, which are shown in FIGS. 3A–3C, respectively, and are synchronized with the horizontal scanning period and displaced in time relative to one another. These signals are generated by three signal sources 37–39, which are connected respectively to the primary windings 41–43 of three transformers 44–46. The transformers 44–46 have secondary windings 47–49, and one end of each of these secondary windings is connected to a common terminal while the other end of the windings 47–49 is connected to one of the output terminals 19–21, respectively.

The signals S33–S35 are rectangular wave signals, as shown in FIGS. 3A–3C, and each has a pulse width of 1H, which is the same as the horizontal scanning period of the electron beam. The horizontal scanning period is 63.5 microseconds in the case of a television system having a horizontal scanning frequency of 15.75KH$_z$. The repetition rate of the signals S33–S35 is one-third the horizontal scanning rate, or 15.75/3 KHz. These signals are not coincident; the signal S34 lags 1H behind the signal S33 and the signal S35 lags 1H behind the signal S34. Such signals may be produced by making use of a pulse signal derived, for example, from a DC-DC converter in a high voltage generator circuit. Such DC-DC converters are well-known and, therefore, need not be shown here.

The common connection of one end of the transformer secondaries 47–49 is connected to the input terminal of a preamplifier 51 through a capacitor 52. At the same time, a DC power supply having a B+ voltage that is typically in the range of about 10–50V is connected by way of a resistor 53 to the common connection of the secondaries 47–49.

When the tube 11 is connected in this manner and the photoelectric conversion layer 16 is scanned with an electron beam at a time when no light is incident on the target of the tube, the electrodes 12 are supplied with a composite voltage comprising the power supply voltage B+ and the signal S33. This may be considered to occur during a horizontal scanning line interval $H_i$. At the same time, the electrodes 13 and 14 are supplied only with the voltage B+ of the power supply. As a result, the potential of the electrodes 12 is higher, by the voltage of the signal S33, than the potential of the electrodes 13 and 14. This causes a rectangular wave signal S54, shown in FIG. 4A, to be derived at the input side of the preamplifier 51. This voltage corresponds to the potential of the electrodes 12 and serves as an index signal. The fundamental frequency of this index signal S54 is determined by the widths and pitches of the electrodes 12–14 and by the time required for one horizontal scanning period of the electron beam from the gun 17. In this case, the fundamental frequency of the index signal S54 is preferably selected to be 3.58MHz, which is the color subcarrier frequency of the NTSC color system. In the case of other color systems, tubes having different construction to arrive at a different fundamental frequency may be provided.

Figure 4:
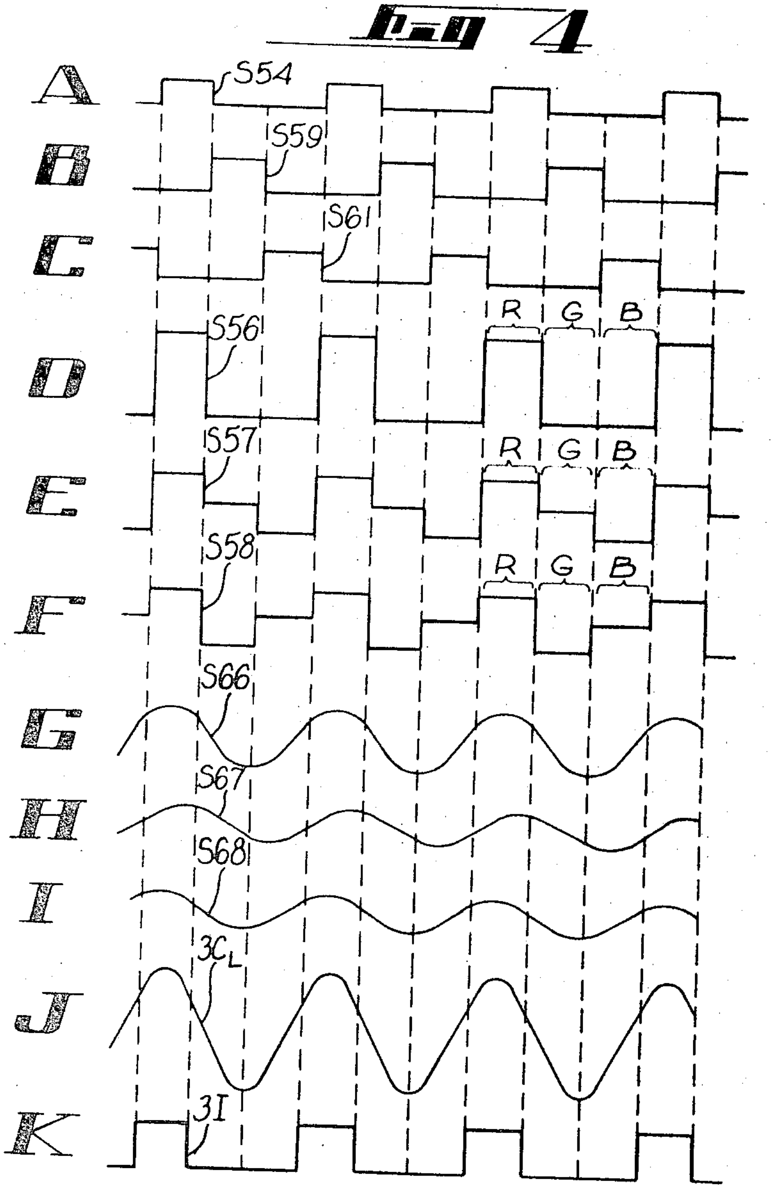

When the light from the object 31 is incident in the photoelectric conversion layer 16, a color-separated image of the object is formed on the layer 16, and a signal corresponding to the color-separated image is superimposed on the index signal S54 to provide a composite signal S56 shown in FIG. 4D. As may be seen, portions of the composite signal S56 corresponding to red, green, and blue light are marked with R, G, and B, respectively. The composite signal S56 is expressed by the sum of a luminance signal Y, a chrominance signal, or carrier color signal, C, and the index signal S54. Thus: S56 = Y + C + S54.

Figure 5:
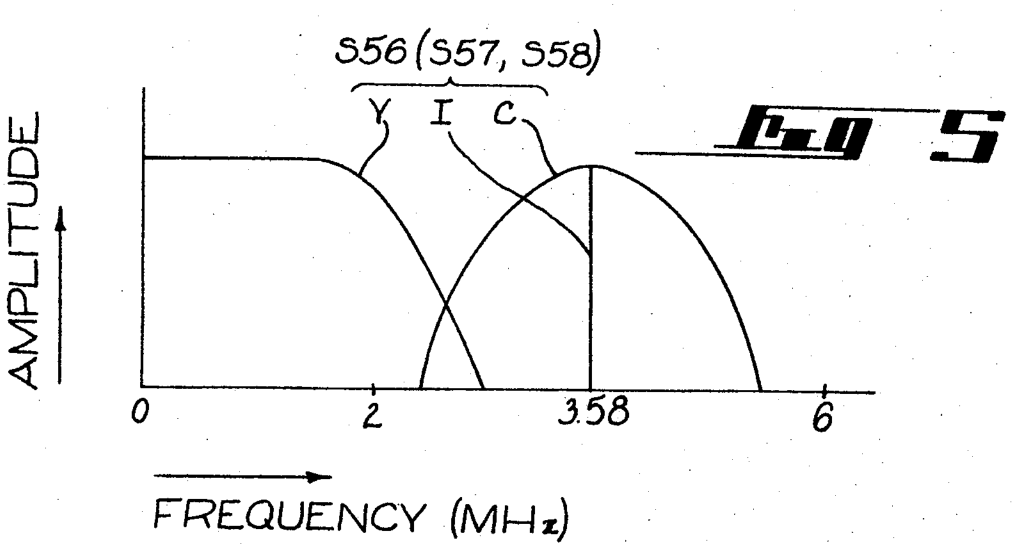
FIG. 5 is a graph illustrating an example of the frequency spectrum of a composite color television signal produced by the system in FIG. 1.

The frequency spectrum of this composite signal S56 is illustrated in FIG. 5 and is determined in part by the widths and spacings of the electrodes 12–14 and the strip filter elements of the optical filter 23 and the horizontal scanning period. Similar composite signals S57 and S58 are formed in the same way and are illustrated in FIGS. 4E and 4F, respectively. The composite signal S56 lies within a frequency period of 6MHz, and the luminance portion Y occupies the lower frequency part of the band while the color signal C occupies the higher frequency part. It is preferred to minimize the overlapping of the luminance signal Y and the color signal C, and, if necessary, the resolution of the image can be lowered slightly by placing a lenticular lens in front of the image pickup tube 11.

In the suceeding horizontal line period $H_{i+1}$, the electrodes 13 are supplied with the signal S34 so that an index signal S59 is produced and is illustrated in FIG. 4B. As is indicated, this signal is delayed relative to the index signal S54 and the amount of delay may be considered as 120° in terms of the periodicity of both of the signals S54 and S59. The composite signal S57 derived at the input side of the preamplifier 51 during this interval of time is shown in FIG. 4E and is expressed by the equation: S57 = Y + C + S59.

During the following horizontal scanning period $H_{i+2}$, the electrodes 14 are supplied with the signal S35. As a result, an index signal S61, as shown in FIG. 4C, is produced. This signal is delayed 120° with respect to the index signal S59. The composite signal S58 derived at the input of the preamplifier 51 during this time is shown in FIG. 4F and is expressed by the equation: S58 = Y + C + S61. In subsequent horizontal scanning intervals $H_{i+3}$, $H_{i+4}$,.... the same operations as have just been described are repeatedly carried out. Accordingly, the preamplifier 51 is supplied with a line sequential signal composed of the signals S56–S58.

The composite signal supplied to the preamplifier 51 is amplified thereby and then transmitted to a processing amplifier 62 to be subjected to waveform shaping and gamma correction. Thereafter, the corrected signal is applied to a low-pass filter 63 and to another filter 64, which may be either a bandpass filter or a high-pass filter. The luminance signal Y is the output signal from the low-pass filter 63, while the output signal of the filter 64 (here assumed to be a bandpass filter) is a signal S66 determined by the equation: S66 $= C_L + S54_L$. This signal S66 is shown in FIG. 4G and corresponding signals for the other two colors and identified by characters S67 and S68 are shown in FIGS. 4H and 4I, respectively. The equation for the signal S67 is: S67 $= C_L + S59_L$ and the equation for S68 is: S68 $= C_L + S61_L$. In this case, the signals $C_L$, $S54_L$, $S59_L$, and $S61_L$ are fundamental wave components of the signals C, S54, S59 and S61, respectively.

A description will be given hereinbelow of the separation of the fundamental wave components $S54_L$, $S59_L$, and $S61_L$ from the carrier color signal $C_L$. In this case, the fundamental wave components of the index signals $S54_L$, $S59_L$, and $S69_L$ have the same frequency as the carrier color signal $C_L$ and, therefore, cannot be separated by means of a filter.

The output signal of the bandpass filter 64 is applied to a 1H delay circuit 69 and the output of this circuit is connected to the input of a second 1H delay circuit 71. These delay circuits may be made up, for example, of crystal delay devices. The outputs of the bandpass filter 64 and of each of the delay circuits 69 and 71 are connected to an adding circuit 72. When the signal S66 reaches the output of the delay cricuit 71, the signal S67 reaches the output of the delay circuit 69 and the signal S68 reaches the output of the bandpass filter 64. Thus, these signals are applied simultaneously to the adding circuit 72. Since the fundamental frequency components $S54_L$, $S59_L$, and $S61_L$ of the index signals are displaced 120° apart from each other in phase, these fundamental frequency components cancel each other in the adding circuit 72. The contents of the carrier color signal $C_L$ in adjacent horizontal scanning lines may be regarded as substantially the same. Thus, the carrier color signals $C_L$ in the signals S66–S68 are in phase and combine in the adding circuit 72 to produce an output signal $3C_L$ as the output signal from the adding circuit 72.

The outputs of the bandpass filter and the two delay circuits 69 and 71 are also connected to a switching device 73 that comprises the equivalent of three three-position switches 74–76. These switches have movable arms 74*a*–76*a*, respectively, each of which makes contact with three fixed contacts identified, for all of the switches, as contacts *b*, *c*, and *d*, spaced the equivalent of 120° apart and in the same relative orientation for each of the switches 74–76. Thus, the movable arms 74*a*–76*a* are brought into contact with each of their respective fixed contacts in the order: *b*, *c*, *d*, *b*, *c*, *d*,.... and are changed from contact to contact at the end of every horizontal scanning line. Furthermore, the movable arms 74*a*–76*a* are placed relative to the respective fixed contacts *b*–*d* such that when the arm 74*a* is on the contact *b*, the arm 75*a* is on the contact c, and the arm 76*a* is on the contact d. In practice, the switches 74–76 are formed as electronic switches using, for example, diodes or transistors or the like.

The output of the bandpass filter 64 is applied to the movable arm 74*a*, the output of the first delay circuit 69 is connected to the movable arm 75*a*, and the output of the second delay circuit 71 is connected to the third movable arm 76*a*. All of the fixed contacts *b* are connected together and are connected to one input circuit of a second adding circuit 78. All of the fixed contacts c are connected together to the input of a phase shifting circuit 79 by which the signals are advanced 120°. All of the fixed contacts d are connected to another phase shifting circuit 81 by which the signals are delayed in phase by 120°. The outputs of the circuits 79 and 81 are also connected to input circuits of the adding circuit 78. The output of the adding circuit 78 is connected to a limiter circuit 82. Since the switches 74–76 are advanced one step at the end of each horizontal line period, the signal S66 is always derived from one of the contacts b of the three switches and the signals S67 and S68 are derived from contacts *c* and *d*, respectively, of the three switches at all times. Since the signals S67 and S68 are transmitted to adding circuit 78 through the phase shifting circuits 79 and 81, the originally in phase carrier color signals C contained in the signals S66-S68 supplied to the adding circuit 78 are displaced 120° in phase from each other and thus effectively cancel each other, while the signals $S54_L$, $S59_L$, and $S61_L$ are brought into phase with each other. Thus, the signals $S54_L$, $S59_L$, and $S61_L$ are added to each other in the adding circuit 78 and supplied to the limiter circuit 82 to provide an index signal 3I having a constant amplitude as shown in FIG. 4K.

Reference numeral 83 represents a color demodulator circuit, which is supplied with the luminance signal Y, the carrier color signal $3C_L$ and the index signal 3I produced as above described to derive red, green and blue color signals $S_R$, $S_G$ and $S_B$ at output terminals 84, 85 and 86, respectively. The circuit 83 is made up of, for example, a synchronous detector circuit which is supplied with the carrier color signal $3C_L$ and the index signal 3I to produce color difference signals $S_R - S_Y$, $S_B - S_Y$ and $S_G - S_Y$ and a matrix circuit which adds the luminance signal $S_Y$ to the color difference signals to provide the color signals $S_R$, $S_G$ and $S_B$ respectively. By suitably processing the red, green and blue color signals thus obtained, color television signals of various systems such as the NTSC system and others can be produced.

In this case, for example, the NTSC system signal can also be directly obtained without producing the color signals by the use of the color demodulator circuit 83. That is, the carriers of the composite signals S66 to S68 are replaced with color subcarrier signals (of 3.58MHz) of the NTSC system and the color subcarrier signals angular-modulated by the color signals are picked up.

In the foregoing example the electrodes 12–14 which function both as index electrodes and as output electrodes are arranged at predetermined intervals, respectively, as depicted in FIG. 2. In the case of forming the electrodes 12–14 with transparent electrodes such as tin oxide, that is, with the so-called nesa electrodes, the electrodes 12–14 are about 20 microns wide and are arranged at intervals of approximately five microns. These electrodes are about 0.2 microns thick and the photoelectric conversion layer 16 is about one micron thick. Accordingly, almost all of those photocarriers which are produced in the areas between adjacent electrodes 12–14 when the light from the object is incident to the photoelectric conversion layer 16, do not reach the electrodes 12–14 but reach the transparent insulating plate 22. This lowers the photoelectric conversion efficiency of the colored light entering the areas where the electrodes 12–14 do not lie to decrease the signal components corresponding to the colored light on those areas. This leads to defects, such as lowering the color fidelity, making it impossible to achieve excellent white balance, deteriorating the signal-to-noise (S/N) ratio, and so on.

Such defects can be avoided by forming a transparent resistance layer 88, as shown in FIG. 6A, extending between the electrodes 12–14 and forming the photoelectric conversion layer 16 over the electrodes 12–14 and the resistance layer 88.

The transparent resistance layer 88 is deposited on the entire area of one side of the transparent insulating plate 22 and the strip-like electrodes 12–14 are formed with a relatively narrow configuration and located on the resistance layer 88 with wide spacings D between adjacent electrodes. The photoelectric conversion layer 16 is formed covering the electrodes 12–14 and the resistance layer 88.

In this case, the transparent resistance layer 88 is a high-resistance nesa coating, such as tin oxide having a sheet resistance of, for example, about $10^5$ to $10^7$ ohms per square centimeter. If antimony is added as an impurity to tin oxide, the resistance value of the resistance layer can be greatly altered by changing the amount of antimony, so that the nesa coating of such a high resistance can be readily obtained. The thickness of the resistance layer 88 is, for example, about 0.5 microns.

In this case, when the electrodes 12–14 are extremely narrow, they need not be formed of a light transparent material but may be formed of a metal such as, for example, copper, aluminum, silver or the like.

Figure 3:
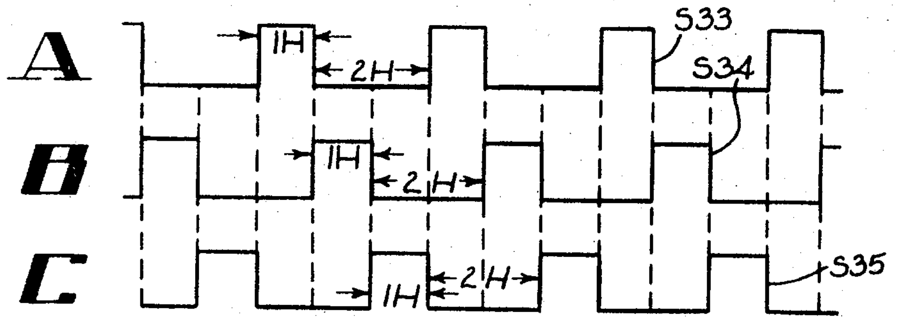
FIGS. 3 and 4 show waveforms obtained in the operation of the system in FIG. 1.

If the arrangement depicted in FIG. 6A is adopted, when the electrodes 12–14 are supplied with the aforementioned alternating signals S33–S35 synchronized with the horizontal scanning period, as shown in FIG. 3, predetermined currents flow in the resistance layer 88 between the electrodes 12–14 to provide in the resistance layer 88 a potential distribution such that the potential gradually rises as the area contiguous to any one of the electrodes 12–14 is approached. Accordingly, in one horizontal scanning period the potential is the highest in the area of the resistance layer corresponding to the electrode 12, so that when no light is incident to the photoelectric conversion layer 16 a potential distribution such as that depicted in FIG. 6B is formed over the photoelectric conversion layer 16. In the subsequent horizontal scanning period, the potential is highest in the area corresponding to the electrode 13, so that a potential distribution such as that shown in FIG. 6C is formed over the photoelectric conversion layer 16. In the third horizontal scanning period, the potential becomes the highest in the area corresponding to the electrode 14, so that a potential distribution, such as that shown in FIG. 6D, is provided over the conversion layer. Consequently, the index signals S54, S59 and S61 produced in the respective periods are triangular wave signals, rather than the rectangular wave signals depicted in FIGS. 4A–4C. However, if the index signals S54, S59, and S61 become triangular wave signals, as above described, the desired operations can be achieved by exactly the same procedure as was previously described in connection with FIG. 1.

With the arrangement shown in FIG. 6A, those photocarriers which are produced in the areas of the conversion layer 16 corresponding to the electrodes 12–14 when the light from the object being televised is incident on the photoelectric conversion layer arrive, as they are, at the electrodes 12–14. Due to the presence of the resistance layer 88, the photocarriers produced between the electrodes 12–14 travel transversely through the resistance layer 88 and reach the electrodes 12–14. Accordingly, there is no reduction of the photoelectric conversion efficiency of the colored light incident on the areas where the electrodes 12–14 do not exist, and the signal components corresponding to the colored light on those portions can also be obtained at the same level as the signal components corresponding to the colored light incident on those areas where the electrodes 12–14 are located. Therefore, color fidelity is not reduced, and perfect white balance can always be obtained and the S/N ratio is increased.

These transparent electrodes 12–14 can be formed so as to be relatively wide. In such a case, the spacings D between adjacent electrodes 12–14 become narrower, so that the transparent insulating plate 22 is covered with a resistance layer such as titanium oxide, which has a sheet resistance of, for example, about $10^{10}$ ohms per square centimeter, which is lower than the dark resistance of the photoelectric conversion layer 16 but higher than that of the aforementioned high-resistance nesa coating, and the electrodes 12–14 are formed on the resistance layer. In this case, since the electrodes 12–14 are wide, the resulting index signals are substantially rectangular as depicted in FIGS. 4A–4C. It will be seen that with such an arrangement, the same results can be obtained as in the case of FIG. 6A.

Further, it is also possible that even if narrow, strip-like electrodes 12–14 are formed, as is the case with FIG. 6A, they can be deposited directly on the insulating plate 22. If so, the resistance layer 88 is formed flush with the electrodes 12–14 on those areas of the insulating plate where the electrodes 12–14 have not been formed.

It is also possible to form relatively wide transparent electrodes 12–14 and form a resistance layer to be flush with these electrodes 12–14.

Further, it is also possible to deposite a transparent resistance layer over the entire area of the insulating plate covering the wide or narrow electrodes 12–14 and filling the gaps between these electrodes and form the photoelectric conversion layer 16 on the transparent resistance layer.

In addition, it is also possible to interpose a first transparent resistance layer between the wide or narrow electrodes 12–14 deposite a second transparent resistance layer on the electrodes and the first resistance layer and to form the photoelectric conversion layer on the second resistance layer.

Figure 6:
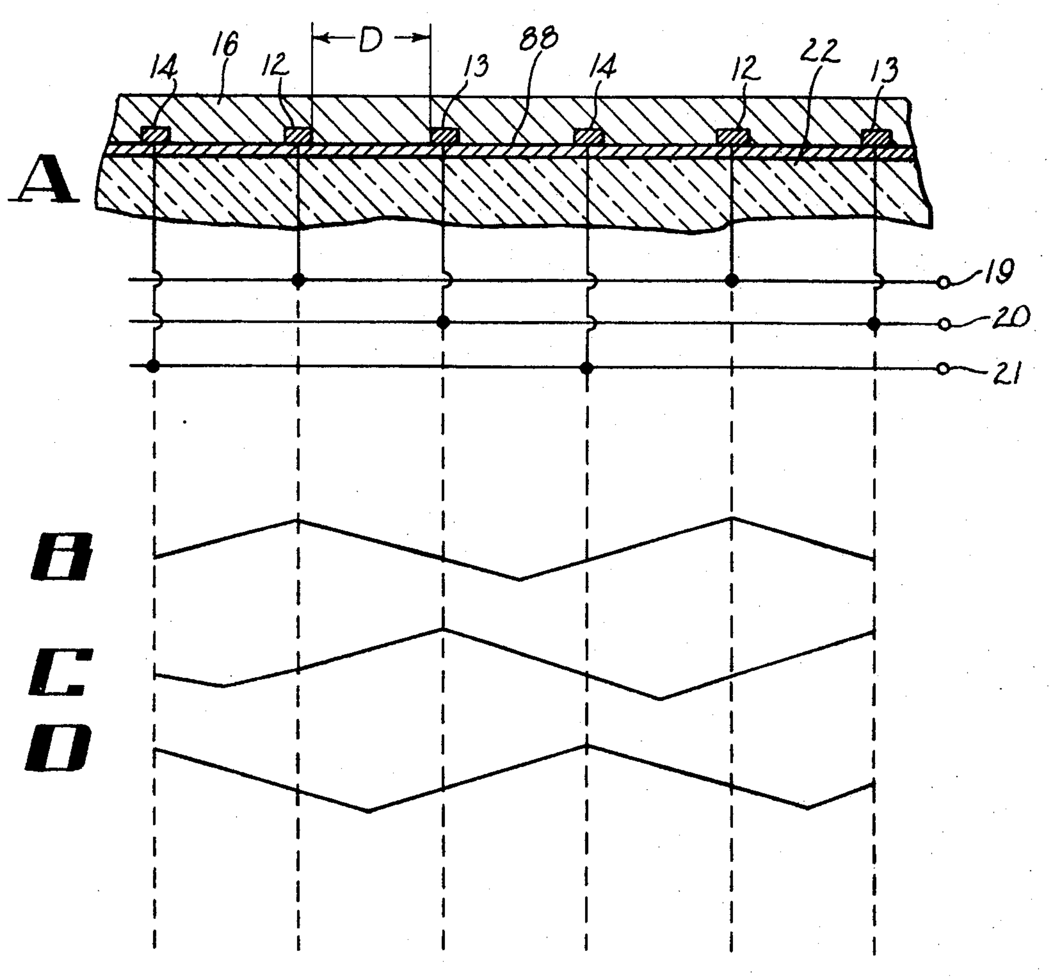
FIG. 6 shows a cross-sectional view of a fragment of a modified image pickup device and further shows waveforms obtained in the operation of such device.
Figure 7:
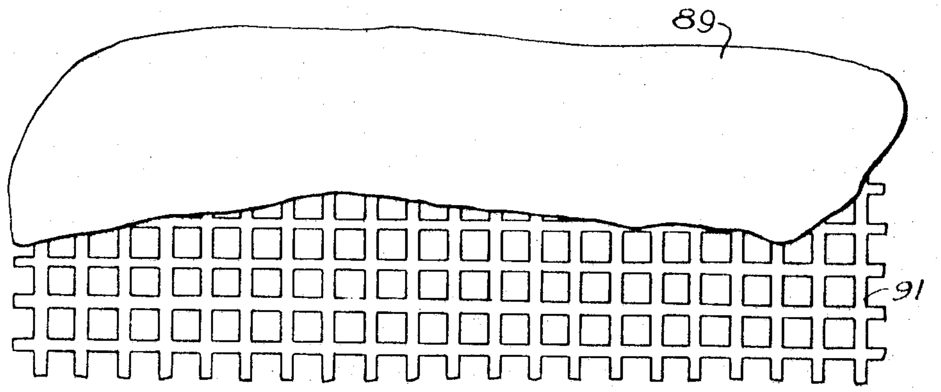
FIG. 7 is a fragmentary plan view of the principle part of a modified form of image pickup device according to the invention and with parts broken away to show different layers.
Figure 8:
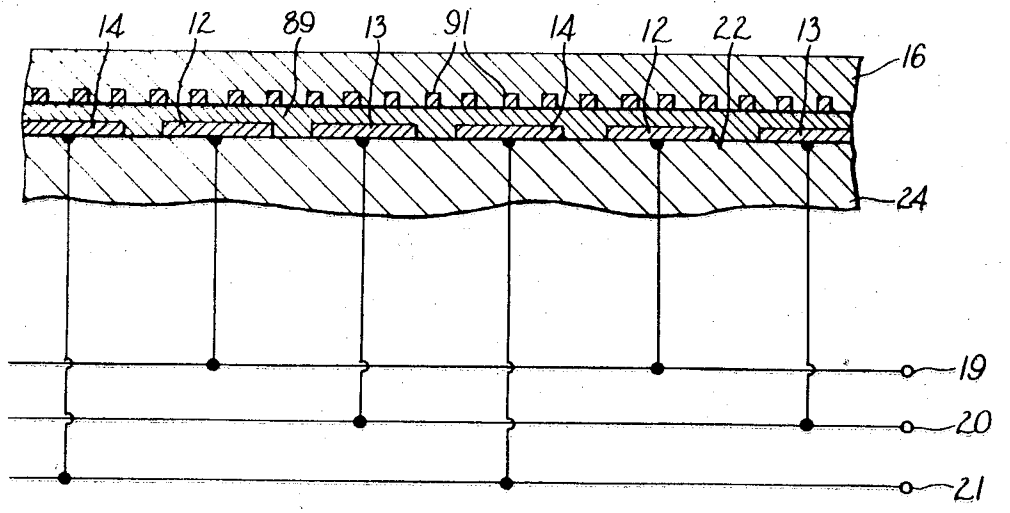
FIG. 8 is a cross-section of a fragment of the device shown in FIG. 7.

In the foregoing examples of this invention depicted in FIGS. 1, 2 and 6 the alternating signals S33–S35 are supplied to the electrodes 12–14 formed on the photoelectric conversion layer 16 and the photoelectric conversion signals are derived from the electrodes 12–14, but it is also possible to provide an additional output or signal electrode by means of which the photoelectric conversion signals are picked up. That is, as illustrated in FIGS. 7 and 8, the electrodes 12–14 are formed on the transparent protective plate 22 at predetermined intervals, and a thin transparent insulating layer 89 is formed thereover. A mesh-like signal electrode 91 of nesa or the like is formed on the insulating layer 89 and the photoelectric conversion layer 16 is formed on the signal electrode in such a manner as to fill its meshes. The output from the signal electrode 91 is led out of the image pickup tube by means of a target ring, as is done vidicon tubes, although it is not shown here. In this case, fields based on the alternating signals S33– S35 applied to the electrodes 12–14 reach the photoelectric conversion layer 16 through the thin transparent insulating layer 89 and the meshes of the signal electrodes 91.

Figure 9:
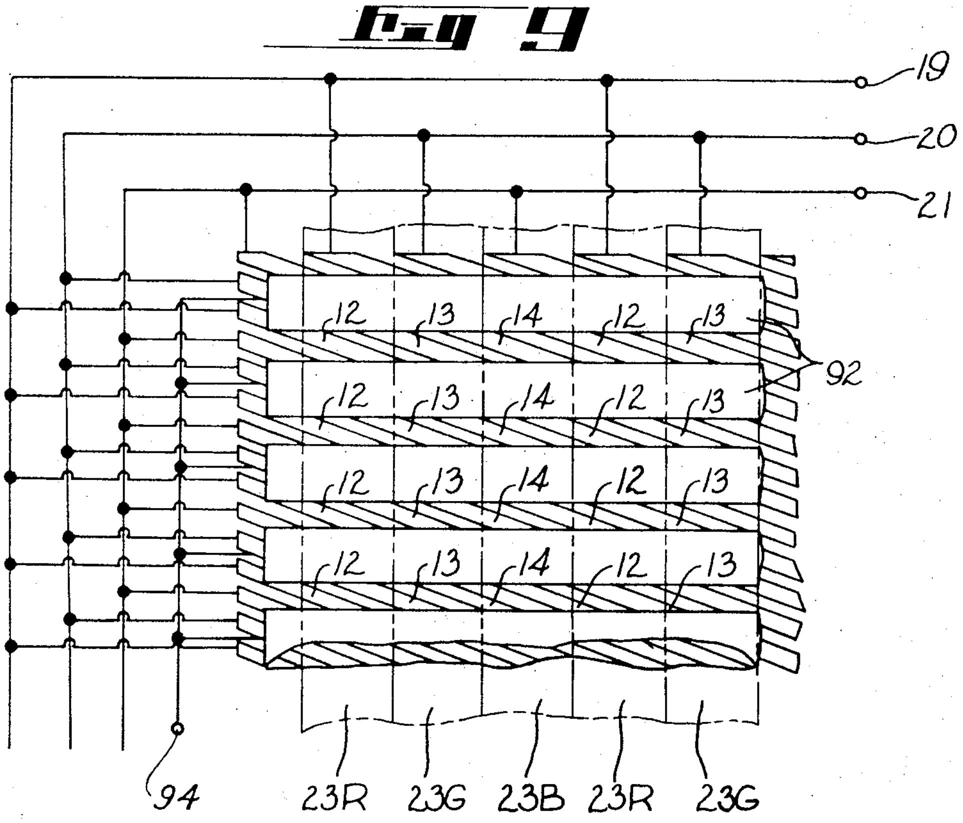
FIG. 9 is a plan view of a fragment of a modified embodiment of a pickup device according to the present invention.
Figure 10:
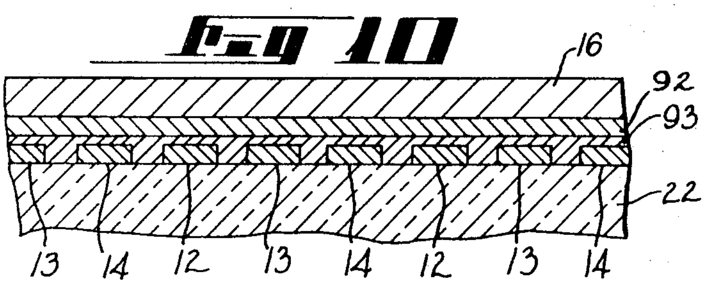
FIG. 10 is a cross-sectional view of the fragment of the pickup device in FIG. 9.

In the examples of this invention illustrated in FIGS. 1 and 2, the electrodes 12–14 are located on the photoelectric conversion layer 16 with the optical strip filter elements 23R, 23G and 23B of the optical filter 23 being coextensive, that is, parallel therewith, however, as shown on FIGS. 9 and 10, by the combined use of shield electrodes 92 with the electrodes 12–14, the optical strip filter elements 23R, 23G, and 23B and the electrodes 12–14 can be arranged obliquely relative to each other. In the embodiment of FIGS. 9 and 10, strip-like transparent electrodes 12–14 of the same width are sequentially formed on the transparent insulating protective plate 22 in a repeating cyclic order at regular intervals and in such a manner as to be oblique to the optical strip filter elements 23R, 23G, and 23B of the optical filter 23. The strip-like transparent shield electrodes 92 of uniform width are formed at regular intervals on the electrodes 12–14 with thin transparent insulating layers 93 interposed therebetween in such a manner that the shield electrodes 92 cross the optical filter elements 23R, 23G, and 23B at right angles thereto. The photoelectric conversion layer 16 is formed covering the shield electrodes and filling the gaps therebetween. The thin transparent insulating layers 93 may be formed on the electrodes 12–14 only at the portions of the latter which do not underlie the shield electrodes 92.

Further, in this case, the width and spacing of the shield electrodes 92 are selected so that the portions of the electrodes 12–14 which are not covered by the shield electrodes 92 may lie in the lengthwise directions of the optical strip filter elements 23R, 23G, and 23B and may be arranged at the same pitches as those of the strip filter elements.

The electrodes 12–14 are supplied with such alternating signals S33–S35 as depicted in FIGS. 3A, 3B and 3C, respectively, as is the case with the examples of FIGS. 1 and 2, and the shield electrodes 92 are interconnected to a terminal 94 to which a constant potential, for example, a ground potential or the like, is supplied. As a result of this, based on the alternating signals fed to the electrodes 12–14 an alternating potential distribution, which is substantially the same (but discontinuous) as that in the examples of FIGS. 1 and 2, is formed on the photoelectric conversion layer 16, either directly or through the thin transparent insulating layers 93.

In accordance with the color image pickup device of this invention, color images can be picked up with only one image pickup tube and no crosstalk is caused between the respective color signals and the optical system is simplified. Thus, excellent color signals can be generated with this a simple construction.

Further, since the index signals are formed with charge images which can be periodically inverted, the index signal can be readily obtained, so that the color signals can be easily demodulated.

In addition, no light is used to produce the index signals, so that the ratio of utilization of light is raised and the dynamic range of the photoelectric conversion layer is thereby increased.

Instead of mounting the optical filter 23 on the image pickup tube 2 as in the foregoing examples, it is also possible to dispose lenticular lens means and an optical filter, such as is mentioned above, or a color filter adjacent to or opposite the front of the image pickup tube 11.

Although the present invention has been described as being applied to a color image pickup device of the type employing a single image pickup tube, the invention is also applicable to a color image pickup device of the type in which the color signals are produced by one image pickup tube and the luminance signal is obtained by another image pickup tube.

The number of stripes of the color separated image of the object being televised formed on the photoelectric conversion layer 16 is not limited specifically to three colors.

What is claimed is:

1. A color image pickup device comprising a surface scanned by an electron beam for converting light projected thereon into an electrical output, filter means disposed between an object in the field of view of said pickup device and said surface for forming on said surface a color separated image of said object made up of image elements corresponding to the color components of respective elements of said object so that a color video signal corresponding to said color separated image is included in said electrical output, electrode means disposed in close proximity to said surface, output means connected with said electrode means for deriving therefrom said electrical output, said electrode means including at least first, second and third sets of electrode elements which extend at an angle to the line scanning direction of said electron beam and which are interlaid in a repeating cyclic order, and circuit means applying first, second and third signal pulses to said first, second and third sets of electrode elements, respectively, said first, second and third signal pulses being phase-displaced with respect to each other by the line scanning period of said electron beam and each having a repetition rate that is one-third the line scanning frequency of said beam for electrically forming on said surface an index image having its phase changed in successive line scanning periods of said beam and by which said electrical output is made to further include an index signal corresponding to said index image and having its phase similarly changed in said successive line scanning periods, said index signal being superimposed on said color video signal in said electrical output for form a composite signal.

2. The pickup device of claim 1; in which said filter means comprises three sets of optical strip elements, the optical strip elements of each set being aligned with the electrode elements of a respective one of said sets of the latter and being substantially transparent to light of a respective fundamental color.

3. The pickup device of claim 2; in which each of said electrode elements is located between said scanning surface and the respective one of said filter elements with which it is aligned.

4. The pickup device of claim 2; comprising, in addition, a transparent insulating plate separating said electrode elements from said filter elements.

5. The pickup device of claim 1; comprising, in addition, a transparent insulating layer between said electrode elements and said scanning surface and covering all of said electrode elements; and, in which said electrode means further includes an additional signal electrode on the surface of said transparent insulating layer away from said electrode elements and facing said scanning surface, said signal electrode being connected with said output means for deriving said electrical output.

6. The pickup device of claim 5 in which said signal electrode is in the form of a mesh.

7. The pickup device of claim 6 in which said scanning surface comprises material filling interstices in said mesh.

8. The pickup device of claim 1; comprising, in addition:

Electrical filter means to transmit only a limited range of said composite signal from said output means;

First delay means connected to said electrical filter means to delay the transmitted composite signal by one line scanning period;

Second delay means connected to said first delay means to delay the delayed signals by an additional line scanning period;

Adding means connected to said electrical filter means and to each of said first and second delay means to add said composite signal to the output signals of both of said delay means for cancelling out fundamental components of said index signal in order to derive the carrier color, or chrominance,-signal.

9. The pickup device of claim 8 comprising, in addition:

A. Switching means comprising first, second, and third switches each having the equivalent of a moving arm and first, second, and third fixed contacts, all of said arms stepping from contact to contact in cyclic order at said line scanning frequency, corresponding ones of said contacts being connected together, but said arms being phased relative to each other so that when said first arm engages said first contact, said second arm engages said second contact and said third arm engages said third contact;

B. A connection from said electrical filter means to said first arm;

C. A connection from said first delay means to said second arm;

D. A connection from said second delay means to said third arm;

E. A second adder;

F. A direct connection from all of said first contacts to said adder;

G. A 120° phase advancing circuit connecting all of said second contacts to said second adder; and H. A 120° phase retarding circuit connecting all of said third contacts to said second adder, whereby said second adder cancels out said color carrier signal and transmits said index signal fundamental component.

10. The pickup device of claim 1; in which said output means is connected with said sets of electrode elements for deriving said electrical output therefrom.

11. The pickup device of claim 1; further comprising second circuit means connected with said output means for separately deriving said index signal and said color video signal from said composite signal.

12. The pickup device of claim 11; in which said second circuit means includes delay means for delaying said composite signal by one line scanning period and by two line scanning periods to provide a one-time delayed composite signal and a two-time delayed composite signal, respectively, first adding means adding together said composite signal and said one-and two-time delayed composite signals fro cancelling said index signal and thereby providing said color video signal separate therefrom, switching means receiving said composite signal and said one- and two-time delayed composite signals and having first, second and third switch outputs, said switching means being actuated in synchronism with said line scanning frequency for supplying said composite signal and said one- and two-time delayed composite signals to said switch outputs in the cyclically repeated order: first, second, third switch outputs; second, third, first switch outputs; third, first, second switch outputs; —, second adding means directly receiving the signal supplied to said third switch output, and phase shifting means connecting said second switch output and said first switch output with said second adding means for relatively phase-shifting the signals supplied to said first and second switch output with respect to each other and with respect to said signal supplied to said third switch output to an extent causing out-of-phase relation of the color carriers in the respective signals, whereby said second adding means cancels out said color video signal and transmits said index signal separate therefrom.

* * * * *